US008351777B2

United States Patent
Nakazawa

(10) Patent No.: US 8,351,777 B2
(45) Date of Patent: Jan. 8, 2013

(54) IMAGE PICKUP APPARATUS HAVING FOCUSING FUNCTION AND ITS CONTROL METHOD

(75) Inventor: Isao Nakazawa, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/875,237

(22) Filed: Sep. 3, 2010

(65) Prior Publication Data

US 2011/0069945 A1 Mar. 24, 2011

(30) Foreign Application Priority Data

Sep. 18, 2009 (JP) .................................. 2009-216309

(51) Int. Cl.
*G03B 13/00* (2006.01)
*G03B 13/34* (2006.01)
(52) U.S. Cl. ..................................................... 396/125
(58) Field of Classification Search .................... 396/125
See application file for complete search history.

(56) References Cited

U.S. PATENT DOCUMENTS

| 4,473,743 A * | 9/1984 | Ishikawa ........................ 250/204 |
| 7,889,890 B2 * | 2/2011 | Miyazaki ....................... 382/118 |
| 2007/0003267 A1 | 1/2007 | Shibutani |
| 2008/0068487 A1 * | 3/2008 | Morita ....................... 348/333.05 |
| 2008/0198258 A1 * | 8/2008 | Ito ................................... 348/349 |
| 2010/0066856 A1 * | 3/2010 | Kishimoto et al. ......... 348/222.1 |
| 2010/0208127 A1 * | 8/2010 | Takada et al. ................. 348/349 |

FOREIGN PATENT DOCUMENTS

| JP | 2007-010898 | 1/2007 |
| JP | 2008287064 A * | 11/2008 |

OTHER PUBLICATIONS

Machine translation of JP2008-287064A.*

* cited by examiner

*Primary Examiner* — Clayton E Laballe
*Assistant Examiner* — Linda B Smith
(74) *Attorney, Agent, or Firm* — Cowan, Liebowitz & Latman, P.C.

(57) ABSTRACT

An image pickup apparatus includes a focus detector that utilizes a phase detection method, an image pickup device, an optical path switch configured to switch a path of light from an object between a first optical path used to lead the light to the focus detector and a second optical path used to lead the light to the image pickup device, a face detector configured to detect a face of the object from the image data, and a controller configured to provide such a control that the optical path switch can set the second optical path after the optical path switch sets the first optical path and the focus detector detects the on-focus state using the phase difference method, and allows the face detector to detect the face of the object after the optical path switch can set the second optical path.

8 Claims, 4 Drawing Sheets

IMAGE PICKUP APPARATUS HAVING FOCUSING FUNCTION AND ITS CONTROL METHOD

BACKGROUND OF THE INVENTION

1. Field of the Invention

The present invention relates to an image pickup apparatus having a focusing function and its control method.

2. Description of the Related Art

A camera having a focusing function used to focus on a face detected by an image recognition using image data is conventionally known. However, the face detecting precision is low for a camera that includes a large image pickup device and an image pickup lens that includes a comparatively bright lens because its depth of field is small and thus image data used for the image recognition is blurred. Accordingly, Japanese Patent Laid-Open No. ("JP") 2007-10898 discloses a technology that moves a focus lens for deep focusing and image recognitions, detects a position of a face of an object, and focuses on that position.

Nevertheless, the deep focusing of JP 2007-10898 may not detect the face through single driving in an on-focus range from the closest end to the infinite end.

SUMMARY OF THE INVENTION

An image pickup apparatus according to one aspect of the present invention includes a focus detector configured to detect a focus state of a focus lens using a phase detection method, an image pickup device configured to generate image data through a photoelectrical conversion of light from an object, an optical path switch configured to switch a path of the light from the object between a first optical path used to lead the light to the focus detector and a second optical path used to lead the light to the image pickup device, a face detector configured to detect a face of the object from the image data, and a controller configured to provide such a control that the optical path switch can set the second optical path after the optical path switch sets the first optical path and the focus detector detects the on-focus state using the phase difference method, and allows the face detector to detect the face of the object after the optical path switch can set the second optical path.

A control method according to another aspect of the present invention of an image pickup apparatus that includes a focus detector configured to detect a focus state of a focus lens using a phase detection method, an image pickup device configured to generate image data through a photoelectrical conversion of light from an object, and an optical path switch configured to switch a path of the light from the object between a first optical path used to lead the light to the focus detector and a second optical path used to lead the light to the image pickup device includes detecting a fact of the object from the image data, and providing such a control that the optical path switch can set the second optical path after the optical path switch sets the first optical path and the focus detector detects the on-focus state using the phase difference method, and allows the face detector to detect the face of the object after the optical path switch can set the second optical path.

Further features of the present invention will become apparent from the following description of exemplary embodiments with reference to the attached drawings.

DESCRIPTION OF THE EMBODIMENTS

Figure 1:
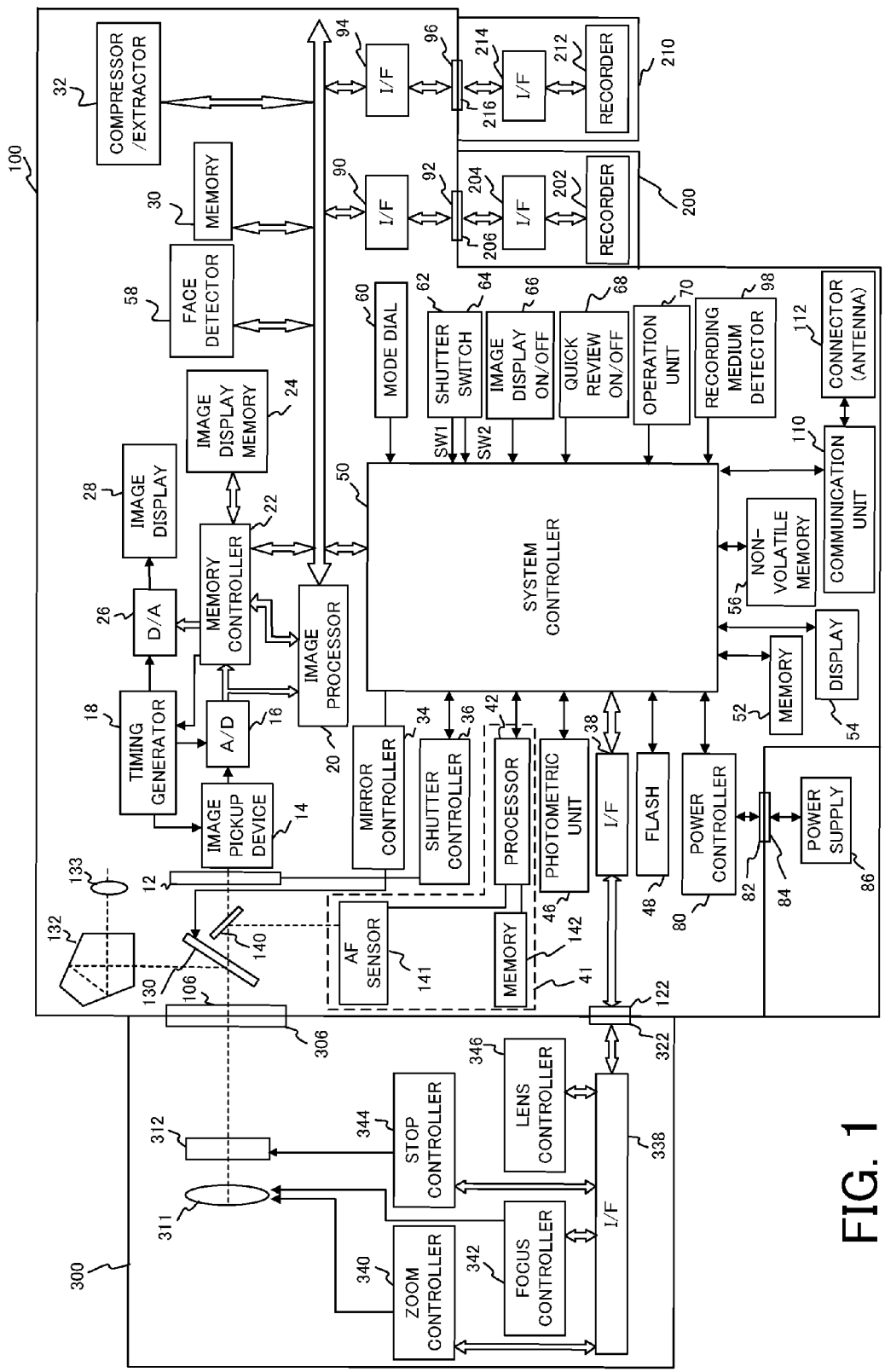
FIG. 1 is a block diagram that illustrates a mirror down state of an image pickup apparatus.
Figure 2:
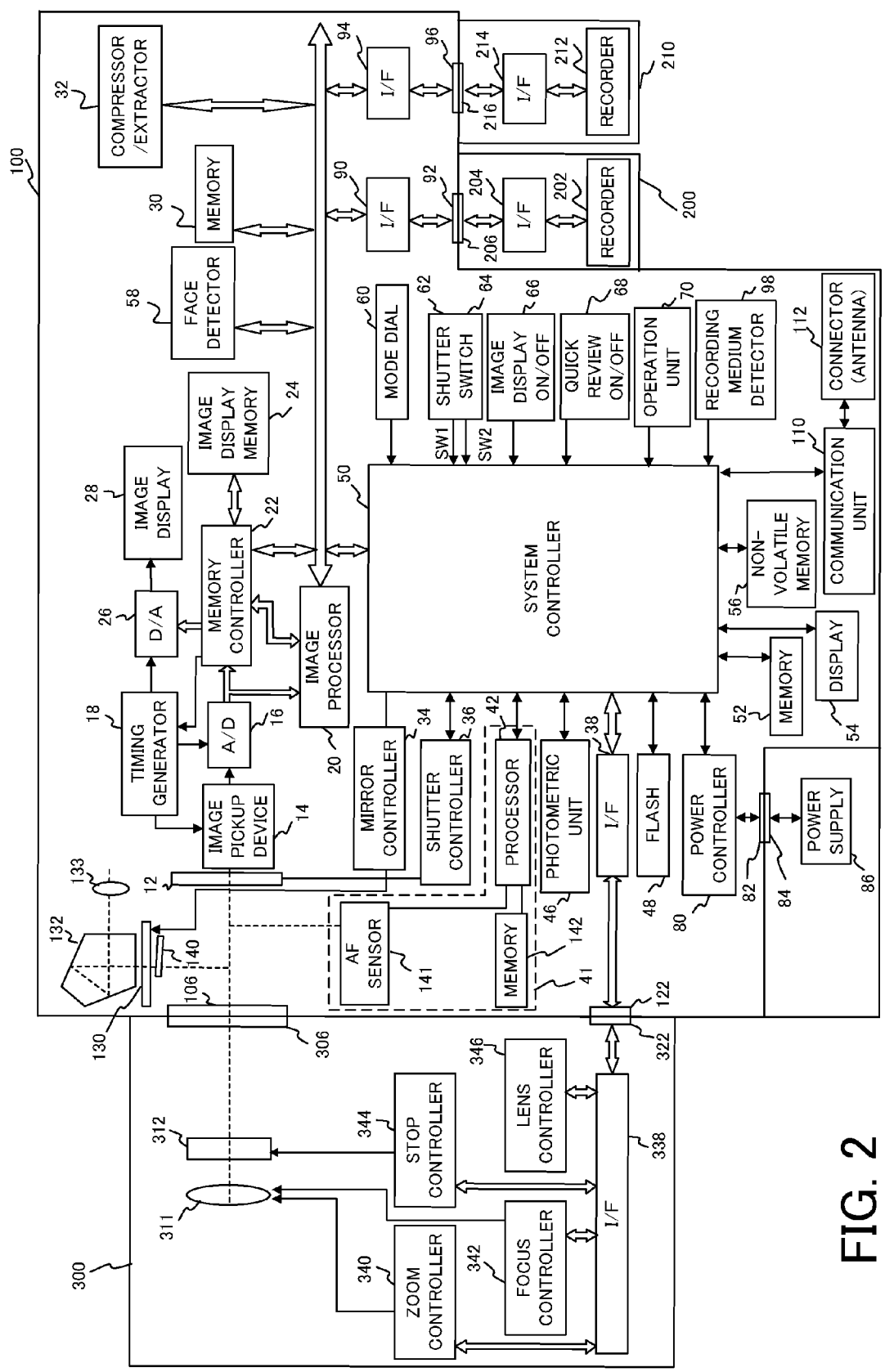
FIG. 2 is a block diagram of a mirror up state of the image pickup apparatus illustrated in FIG. 1.

FIGS. 1 and 2 are block diagrams that illustrate a lens exchange type image pickup apparatus, and are different from each other in an optical path used to lead light from the object. FIG. 1 illustrates a (mirror down) state in which the light from the object is led through a first optical path to a focus detector 41 that uses a phase difference method and an optical viewfinder. FIG. 2 illustrates a (mirror up) state in which the light from the object is led through a second optical path to an image pickup device 14. The first optical path and the second optical path are switchable to each other.

The image pickup apparatus includes a camera body 100 and a lens unit 300 that is to be exchangeably attached to the camera body 100.

The camera body 100 is configured to take, process and record an image of an object, and provide other processes. These processes contain a focus detection process using the phase difference detection method, a face detection process that detects a face of a human (object) using image data obtained by the image pickup device 14, and a live view display process that sequentially displays image data to be taken.

Reference numeral 12 denotes a shutter configured to adjust an exposure amount. The image pickup device 14 generates image data through a photoelectric conversion of the light from the object. Reference numeral 16 denotes an A/D converter configured to convert an analogue signal output from the image pickup device 14 into a digital signal (image data). Reference numeral 18 denotes a timing generator configured to supply a clock signal and a control signal to the image pickup device 14, the A/D converter 16, and a D/A converter 26, and is controlled by a memory controller 22 and a system controller 50.

Reference numeral 20 denotes an image processor configured to perform a pixel interpolation process and a color conversion process for image data from the A/D converter 16 or image data from the memory controller 22. In addition, the image processor 20 calculates the image data, and the system controller 50 controls the shutter controller 36, a focus detection process of a contrast detection method, an auto-exposure ("AE") method, and a flush pre-emission ("EF") process based on the calculation result.

The memory controller 22 controls the A/D converter 16, the timing generator 18, the image processor 20, the image display memory 24, the D/A converter 26, the memory 30, and the compressor/extractor 32. The data of the A/D converter is written in the image display memory 24 or the memory 30 via the image processor 20 and the memory controller 22 or only via the memory controller 22.

Reference numeral 28 denotes an image display (back surface monitor), such as a liquid crystal monitor, arranged on a back surface of the camera. An electronic viewfinder function using the back surface monitor can be realized by sequentially displaying image data to be taken on the image display 28. The image display 28 can arbitrarily is turned on and off according to a command of the system controller 50. Sequential displaying of the image data on the image display 28 is referred to as a live view display, and an image displayed on the electronic viewfinder is referred to as a live view image.

The memory 30 can store taken still and motion images, and can be also used for a work area for the system controller 50. The compressor/extractor 32 compresses and extracts the image data.

Reference numeral 34 denotes a mirror controller that includes a motor and a driver configured to move a quick return mirror 130 and an autofocus (AF) use sub-mirror 140 between the mirror down positions illustrated in FIG. 1 and the mirror up positions illustrated in FIG. 2, which will be described later. The mirror controller 34, the quick return mirror 130, and the AF use sub-mirror 140 constitute an optical path switch. The optical path switch switches the optical path between the first optical path (FIG. 1) used to lead the light from the object to the focus detector 41 that uses the phase difference method and the optical viewfinder, and the second optical path (FIG. 2) used to lead the light from the object to the image pickup device 14.

The shutter controller 36 controls opening and closing of the shutter 12 based on photometric information from the photometric unit 46 in association with a stop controller 344 configured to control the stop 312.

Reference numeral 38 denotes an interface configured to connect the camera body 100 to the lens unit 300 in a lens mount 106, and reference numeral 122 denotes a connector configured to electrically connect the camera body 100 to the lens unit 300.

The focus detector 41 that uses the phase difference method includes a processor 42, an AF sensor 141, and a memory 142 for a focus detection using a phase difference method.

When the optical path switch sets the first optical path, the light incident upon the image pickup lens 311 transmits the stop 312, the lens mounts 306 and 106, and the quick return mirror 130, is reflected (deflected) by the AF use sub-mirror 140, and enters the AF sensor 141. The surface of the quick return mirror 130 is provided with a coating, and reflects the light from the object toward the optical viewfinder, which will be described later.

The focus detection according to the phase detection method is a method for detecting a focus state of the image pickup optical system based on a shift amount between a pair of optical images obtained from a pair of re-imaging optical systems. The processor 42 calculates an on-focus state of the object image (optical image) of the AF sensor 141, detects focus for a plurality of focus detection fields, and outputs a focus signal.

The memory 142 constitutes a focus memory configured to store a detection result.

The camera body 100 includes a contrast focus detector (not illustrated) configured to detect focus according to a contrast method using a contrast component of the image data obtained by the image processor 20. The focus detection according to the contrast method utilizes a (peak tracing) method for detecting a focus lens position corresponding to a contrast peak by moving (a focus lens (not illustrated) in) the image pickup lens 311.

The photometric unit 46 serves to provide the auto-exposure (AE) process and the flash pre-emission (EF) process in association with the flash 48.

The system controller (processor) 50 controls the entire camera body 100, and includes a built-in timer (not illustrated). Reference numeral 52 denotes a memory configured to store a constant, a variable, and a program used for an operation of the system controller 50.

The system controller 50 provides focusing by moving the focus lens in the image pickup lens 311 based on a detection result of the focus detector 41 that uses the phase difference method. In addition, the system controller 50 controls the mirror controller 34 so that the mirror controller 34 can set the second optical path, and then allows the face detector 58 to detect the face of the object. Thus, when the object is focused in accordance with the phase difference method, the system controller 50 switches the optical path as illustrated in FIG. 2 so as to lead the light from the object to the image pickup device 14, and enables the human face to be detected from the image data generated by the image pickup device 14. In addition, since the face of the object is focused at the face detection time, the face detection precision improves.

Reference numeral 54 denotes a display, such as a liquid crystal display and a speaker, configured to display an operational state and a message according to an execution of a program in the system controller 50. Part of the function of the display 54 is provided to the inside of the optical viewfinder. The display 54 can display an on-focus state based on an on-focus signal output from the system controller 50 as well as information on the number of shots and image pickup condition.

Reference numeral 56 denotes an electrically erasable and recordable non-volatile memory.

The face detector 58 is configured to detect a face of an object from image data from the image processor 20 or image data from the memory control circuit 22, and the detection method is not particularly limited as long as it utilizes the image data of the object. The camera body 100 has a focusing function using the contrast method so that the face detected by the face detector 58 can be focused. This method requires image data of the image pickup device in order to detect the face of the human (object) from the image data of the image pickup device 14 and to focus on the face. In other words, in the digital single-lens reflex camera cannot obtain image data when the light from the object is led to the focus detector 41 that uses the phase difference method or thus detect a face for this time period.

Reference numeral 60 denotes a mode dial switch (mode setting unit) configured to set a variety of functional modes, such as a power off, an auto image pickup mode, a manual image pickup mode, a panorama image pickup mode, a macro image pickup mode, a reproduction mode, a multi-screen reproduction/erase mode, and a PC connection mode. The mode dial switch can set, for example, a live view mode, a still image pickup mode, a consecutive shooting mode, etc.

Reference numeral 62 denotes a shutter switch (SW1) configured to turn on when a shutter button (not illustrated) is half-pressed, and to instruct an operational initiation including the AF process. Reference numeral 64 denotes a shutter switch (SW2) configured to turn on when the shutter button (not illustrated) is fully pressed, and to instruct an operational initiation of a series of operations relating to the photography. The processes relating to the photography contain an exposure process, a development process, and a recording process. The shutter switches 62 and 64 serve as a focusing starter configured to start a focusing action.

Reference numeral 66 denotes an image display ON/OFF switch configured to turn on and off the image display 28. Reference numeral 68 denotes a quick review ON/OFF switch configured to set a quick review function that automatically reproduces a taken image data just after image pickup. Reference numeral 70 denotes an operating unit including a variety of buttons and a touch panel.

Reference numeral 80 denotes a power controller, reference numerals 82 and 84 denote connectors, reference numeral 86 denotes a power supply, and reference numerals 90 and 94 denote interfaces (connectors) with recording media. Reference numeral denotes a recording medium detector configured to detect a recording medium in the connector 92 or 96, and reference numeral 110 denotes a communication unit. Reference numeral 112 denotes a connector when the communication unit 110 connects the camera body 100 with another apparatus or an antenna in case of radio communications.

The connector 122 serves to transmit a control signal, a state signal, and a data signal between the camera body 100 and the lens unit 300, and to supply current for a variety of voltages.

The light from the object reflected on the quick return mirror 130 is image-inverted by a pentaprism 132, and an eyepiece lens 133 forms an optical viewfinder by which a photographer can observe the object.

Reference numeral 200 and 210 denote recording media, and include recorders 202 and 212, interfaces 204 and 214 with the camera body 100, and connectors 206 and 216 to be connected with the camera body 100.

In the lens unit 300, reference numeral 311 denotes an image pickup lens that includes one or more focus lens used for focusing on the object. The focus lens is configured to move in the optical axis direction. Reference numeral 312 denotes a stop.

Reference numeral 322 denotes a connector used to electrically connect the lens unit 300 to the camera body 100. Reference numeral 338 denotes an interface used to connect the lens unit 300 to the connector 122 of the camera body 100. Reference numeral 340 denotes a zoom controller of the image pickup lens 311, and reference numeral 342 denotes a focus controller of the image pickup lens 311. Reference numeral 346 denotes a lens system controller configured to control the entire lens unit 300.

In the state illustrated in FIG. 2, no light is led to the optical viewfinder, and a photographer can observe a live view image of the object on the image display 28. In this state, the image processor operates the image data generated from the image pickup device 14 and performs a focusing control utilizing the contrast method based on the obtained operation result. In addition, the face of the object can be detected using the face detector 58.

First Embodiment

Figure 3:
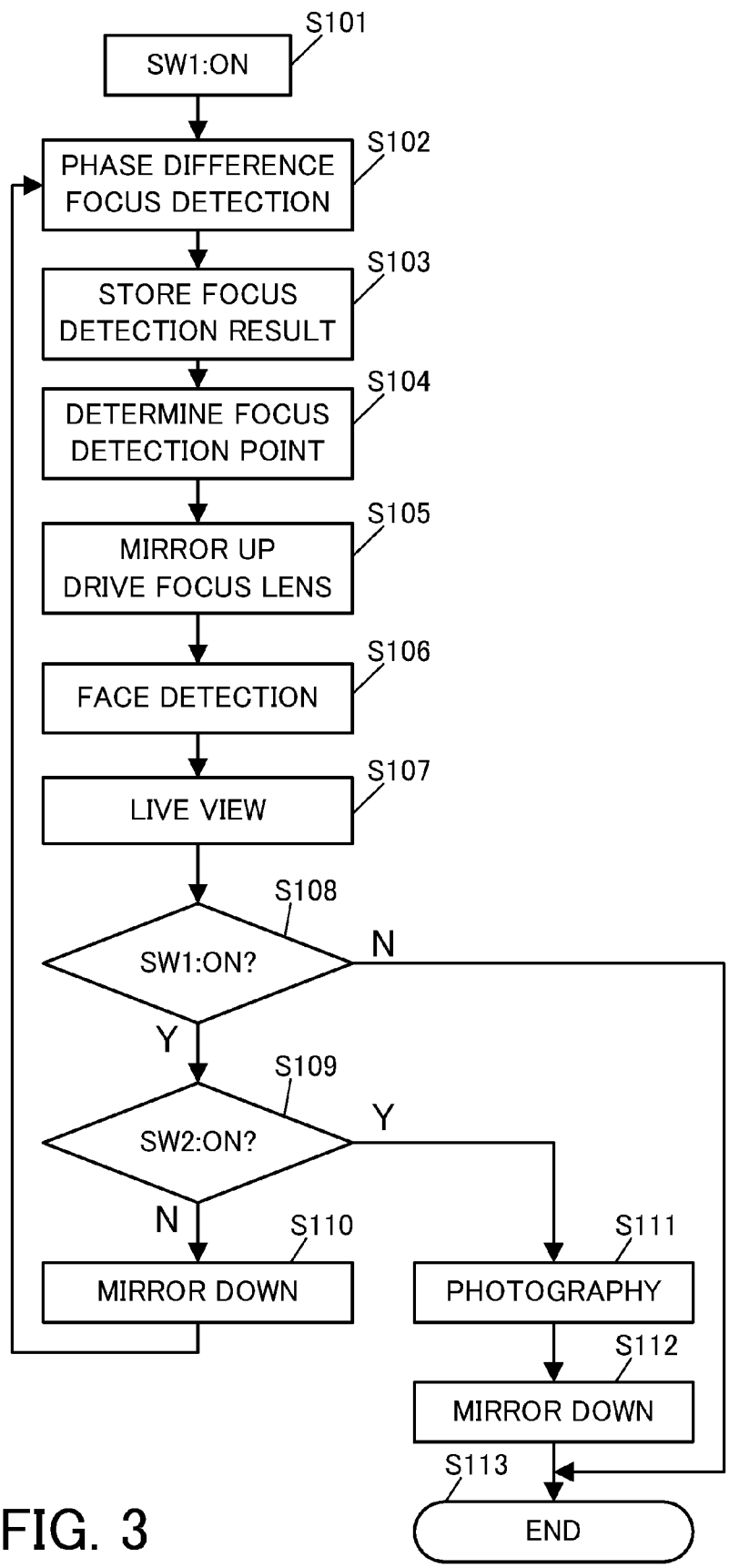
FIG. 3 is a flow chart for explaining an operation of the image pickup apparatus illustrated in FIG. 1 according to a first embodiment.

Referring now to FIG. 3, a description will be given of an operation of the image pickup apparatus illustrated in FIGS. 1 and 2. In FIG. 3, "S" stands for the step. The system controller 50 controls the flow illustrated in FIG. 3. In the prior art, in observing the live view image or at the motion image pickup, the image pickup apparatus has a problem of erroneously detecting the face of the object due to the small depth of field as discussed above. Accordingly, this embodiment improves the face detection precision by the face detector 58 through focusing on the basis of the focus detection utilizing the phase difference method in the live view mode. This embodiment is applicable to the motion image pickup mode as well as the live view mode.

Initially, when a photographer pursues the live view display in the state illustrated in FIG. 1, he sets the live view mode with the mode dial switch 60, and commands the live view display. When the shutter switch 62 turns on (S101), the system controller 50 allows the light from the object to reach the focus detector 41 that utilizes the phase difference method through the first optical path. In addition, the system controller 50 provides such a control that the processor 42 can detect focus to the object image of the AF sensor 141 according to the phase difference method (S102). The detection result of the focus detector 41 is stored in the memory 142 (S103).

Next, the system controller 50 determines the focus detection field that is apparently a main object (S104). Thereafter, the system controller 50 controls the mirror controller 34, and moves the quick return mirror 130 and the AF use sub-mirror 140 as illustrated in FIG. 2 so as to transfer to the live view mode. In addition, along with this, the system controller 50 controls the focus detector 342 based on the focus detection result, moves the focus lens in the image pickup lens 311, and provides focusing (S105).

After the live view mode starts, the photographer can observe the object image on the real-time basis on the image display 28, but the light is not led to the focus detector 41. Accordingly, focusing based on the focus detection of the contrast method subsequently starts.

The face detector 58 detects the face using the image data from the image processor 20 or the image data from the memory controller 22 (S106) so that the face can be focused. Thus, after the live view mode is set, the shutter switch 62 is turned on and is ready to receive a focus detection command. The system controller 50 provides focusing according to the phase difference method, and then allows the face detector 58 to detect the face of the object. This embodiment detects the face after the object is focused in accordance with the phase difference method. Since the field that appears to be the main object is focused beforehand, the face detection precision is improved even for the image pickup apparatus having a small depth of field because a frequency of an erroneous detection or unable detection reduces.

When the photographer changes a composition or changes an image pickup object while he is observing an object in the live view mode, a large amount of defocus may occur. In this case, focusing in accordance with the contrast method may be used, but this method requires a long time. Accordingly, in this case, the photographer can again half-press the shutter button, turn on the shutter switch 62, and thereby make the image pickup apparatus again detect focus in accordance with the phase difference method.

In S108, when the system controller 50 receives a focus detection command in response to turning on of the shutter switch 62, the system controller 50 determines whether or not the shutter switch 64 is turned on (S109).

When the system controller 50 determines that the shutter switch 64 is turned on as a result of the photographer fully presses the shutter button (Y of S109), the system controller 50 takes a still image (S111). After the image pickup ends, the system controller 50 moves the quick return mirror 130 to the (mirror up) position illustrated in FIG. 1 (S112), and ends the process (S113).

On the other hand, when the system controller 50 determines that the shutter switch 62 is not turned for a predetermined time period using the timer (not shown) (N of S109), the system controller 50 controls the mirror controller 34. As a result, the quick return mirror 130 and the AF use sub-mirror 140 move to the (mirror up) positions illustrated in FIG. 1 (S110), and then the flow returns to S102. Thereby, the face can be detected after the object is focused in accordance with the phase difference method.

Thus, when the shutter switch 62 again starts the focusing action and no image pickup follows after the face detector 58 detects the face, the system controller 50 controls the mirror controller 34 so that the mirror controller 34 can set the first optical path illustrated in FIG. 1 so as to repeat the detection using the focus detector 41, focusing the detection result, and a face detection using the face detector 58. Thereby, the face can be detected after the object is focused in accordance with the phase difference method by returning to the state illustrated in FIG. 1 even after the state becomes as illustrated in FIG. 2.

The system controller 50 ends the process (S113) after S107 when determining that the shutter switch 62 is not turned on for the predetermined period (N of S108) or when the live view mode ends as a result of that the mode dial switch 60 is operated.

Second Embodiment

Figure 4:
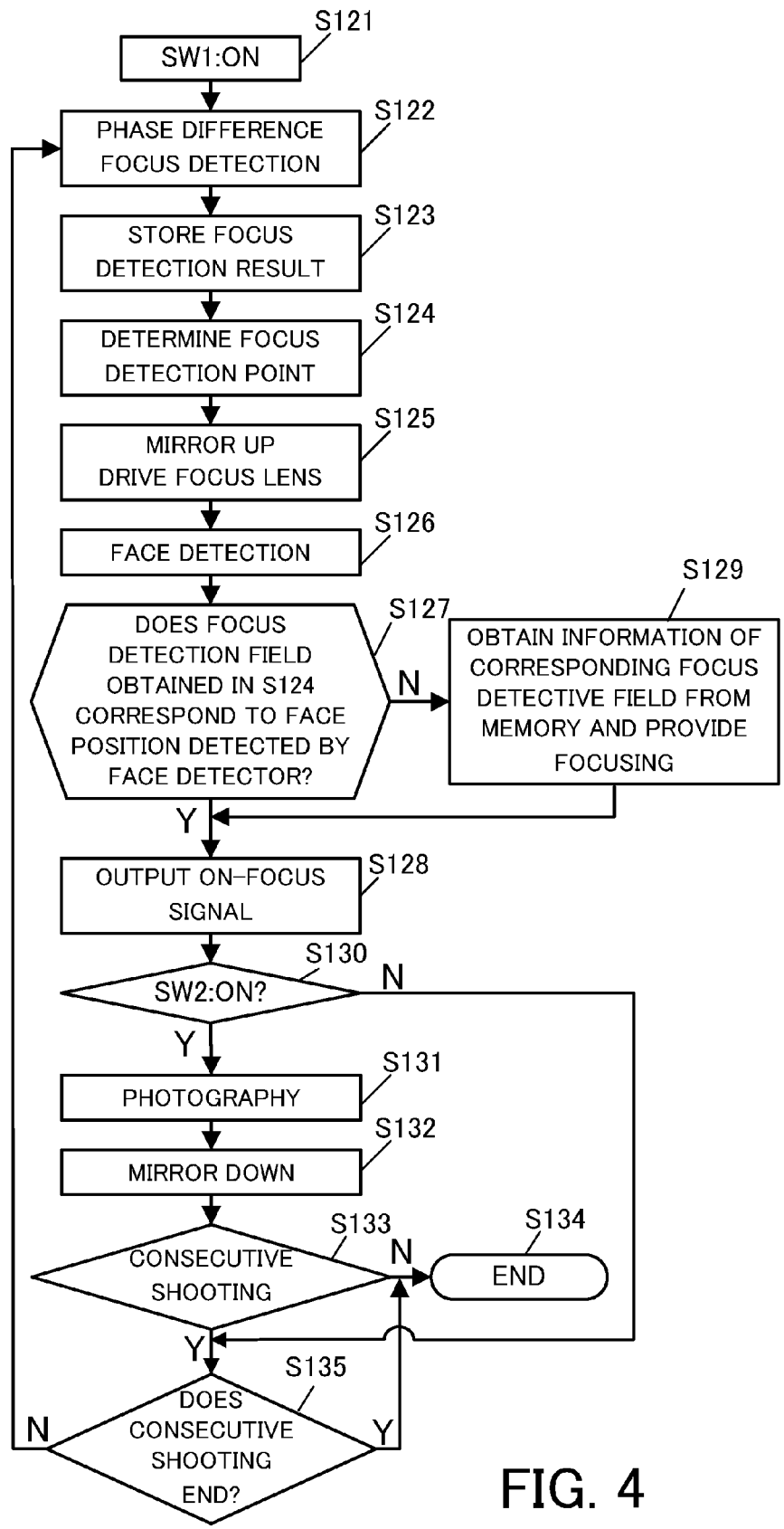
FIG. 4 is a flow chart for explaining an operation of the image pickup apparatus illustrated in FIG. 1 according to a second embodiment.

Referring now to FIG. 4 a description will be given of another operation of the image pickup apparatus illustrated in FIGS. 1 and 2. In FIG. 4, "S" stands for the step.

The focus detection according to the phase difference method provides faster and quicker focusing than the focus detection according to the contrast method. However, the optical path in the image pickup apparatus is divided into the first optical path used to lead the light from the object to the focus detector 41 and the second optical path used to lead the light to the image pickup device 14. Therefore, when the light from the object is led to the focus detector 41, the face cannot be detected since the light from the object cannot reach the image pickup device 14 or the image data is not obtained. This embodiment enables a still image to be taken while the face detection position corresponds to the focus detection field obtained by the focus detection in accordance to the phase difference method.

Initially, when the photographer attempts to take a still image in the state illustrated in FIG. 1, the photographer half-presses the shutter button (not shown) with an arbitrary composition using the optical viewfinder. As a result, the shutter switch 62 turns on (S121), and the image pickup preparation is initiated.

Next, the processor 42 detects focus in accordance with the phase difference method for the object image of the AF sensor 141 (S122). The detection result of the focus detector 41 is stored in the memory 142 (S123).

Next, the system controller 50 determines the focus detection field that appears to be a main object (S124). Thereafter, the system controller 50 controls the mirror controller 34 and moves the quick return mirror 130 and the AF use sub-mirror 140 to the (mirror up) positions as illustrated in FIG. 2. In addition, along with this, the system controller 50 controls the focus controller 342 based on the focus detection result, moves the image pickup lens 311, and provides focusing (S125).

Next, the face detector 58 detects the face for the image data from the image processor 20 or the image data from the memory controller 22 (S126).

Next, the system controller 50 determines whether the focus detection field obtained in S124 corresponds to the position of the face detected by the face detector 58 (S127). Whether it corresponds or not is determined based on whether the position of the focus detection field falls within a permissible range of the detected face position (or whether the face position is located in the set focus detection field range).

When the system controller 50 determines that it corresponds (Y of S127), the system controller 50 outputs an on-focus signal (S128). On the other hand, when the system controller 50 determines that it does not correspond (N of S127), the system controller 50 obtains information of the corresponding focus detection field, controls the focus controller 342 to that position, provides focusing (S129), and then outputs the on-focus signal (S128).

After the photographer confirms the on-focus signal on the display 54, the photographer can fully press the shutter button and turn on the shutter switch 64. In this embodiment, the photographer can take a still image after the on-focus signal is output which represents that the focus detection field detected by the focus detection in accordance with the phase difference method corresponds to the face position detected by the face detection. Thus, the photographer can take the object in a good focus state.

When the system controller 50 determines that the shutter switch 64 is turned on (Y of S130), the system controller 50 takes a still image (S131) and controls the mirror controller 34. As a result, the quick return mirror 130 and the AF use sub-mirror 140 move to the (mirror down) positions illustrated in FIG. 1 (S130). On the other hand, when the system controller 50 determines that the shutter switch 64 is remained to turn off for a predetermined period using the built-up timer (Y of S130), the system controller 50 ends the process (S134).

When the system controller 50 determines, after S132, that the consecutive shooting mode is set via the mode dial switch 60 (S133), the system controller 50 determines whether the consecutive shooting has ended (S135), and if not (N of S135) the flow returns to S122. When the system controller 50 determines that the consecutive shooting mode is not set (N of S133) or the consecutive shooting has ended (Y of S135), the system controller 50 terminates the process (S134). Thereby, the object that has been focused in accordance with the phase difference method is taken for each image pickup time of the consecutive shooting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image pickup apparatus is applicable to photography of the object.

This application claims the benefit of Japanese Patent Application No. 2009-216309, filed Sep. 18, 2009, which is hereby incorporated by reference herein in its entirety.

What is claimed is:

1. An image pickup apparatus comprising:
a first focus detector configured to detect a focus state of a focus lens using a phase detection method;
an image pickup device configured to generate image data through a photoelectrical conversion of light from an object;
a second focus detector configured to detect the focus state of the focus lens using a contrast method that uses the image data;
an optical path switch configured to switch a path of the light from the object between a first optical path used to lead the light to the first focus detector and a second optical path used to lead the light to the image pickup device;
a face detector configured to detect a face of the object from the image data;
a display configured to display an image during a live view mode;
a setting part configured to set the live view mode that sequentially displays the image data on the display; and
a controller configured to, when a shutter switch is turned on in the live view mode, allow:
(1) the optical path switch sets the first optical path after the detection of the focus state using the contrast method is ended,
(2) the first focus detector detects the on-focus state using the phase difference method after the optical path switch sets the first optical path, (3) the optical path switch sets the second optical path after the focus detector detects the on-focus state using the phase difference method, and (4) the face detector detects the face of the object after the optical path switch sets the second optical path.

2. The image pickup apparatus according to claim 1, wherein the controller moves the focus lens based on a detection result of the focus detector and provides focusing in providing the control such that the optical path switch can set the second optical path.

3. The image pickup apparatus according to claim 1, further comprising a memory configured to store a detection result of the focus detector,
wherein the controller reads out of the memory a focus detection result in a focus detection field corresponding to a position of the face detected by the face detector, and moves the focus lens based on the focus detection result and provides focusing.

4. The image pickup apparatus according to claim 1, further comprising a reception unit configured to receive a focus detection command of the focus detector,
wherein when the reception unit receives the focus detection command, the controller provides such a control that the optical path switch can set the first optical path, then the focus detector can detect focus, then the optical path switch can set the second optical path, and then the face detector can detect the face.

5. The image pickup apparatus according to claim 1, further comprising:
a memory configured to store a detection result of the focus detector;
a focusing starter configured to start a focusing action; and
a mode setting unit configured to set a still image pickup mode,
wherein when the focusing starter starts the focusing action after the mode setting unit sets the still image pickup mode, the controller obtains information of a focus detection field of a main object, provides focusing, then determines whether or not the focus detection field corresponds to a position of the face detected by the face detector, outputs an on-focus signal when the focus detection field corresponds, and outputs the on-focus signal after obtaining the information of a corresponding focus detection field from the memory when the focus detection field does not correspond, before a still image is taken.

6. The image pickup apparatus according to claim 4, further comprising the image pickup command receiver configured to receive an image pickup command of a still image,
wherein the still image is taken without the focus detection by the focus detector when the image pickup command receiver receives the image pickup command of the still image within a predetermined time period after the reception unit receives the focus detection command; and
wherein the focus detector provides the focus detection when the image pickup command receiver receives no image pickup command of the still image within the predetermined time period after the reception unit receives the focus detection command.

7. The image pickup apparatus according to claim 5, further comprising a mode setting unit configured to set a consecutive shooting mode used to consecutively shoot a plurality of still images,
wherein when the still image is taken in the consecutive shooting mode, the controller provides such a control that the optical path switch can set the first optical path and then allows a detection and focusing by the focus detector and a face detection by the face detector.

8. A control method of an image pickup apparatus that includes a first focus detector configured to detect a focus state of a focus lens using a phase detection method, an image pickup device configured to generate image data through a photoelectrical conversion of light from an object, a second focus detector configured to detect the focus state of the focus lens using a contrast method that uses the image data, an optical path switch configured to switch a path of the light from the object between a first optical path used to lead the light to the focus detector and a second optical path used to lead the light to the image pickup device, a display configured to display an image during a live view mode, and a setting part configured to set the live view mode that sequentially displays the image data on the display, the control method comprising the steps of:
detecting a face of the object from the image data; and
when a shutter switch is turned on in the live view mode, allowing:
(1) the optical path switch sets the first optical path after the detection of the focus state using the contrast method is ended,
(2) the first focus detector detects the on-focus state using the phase difference method after the optical path switch sets the first optical path,
(3) the optical path switch sets the second optical path after the focus detector detects the on-focus state using the phase difference method, and
(4) the face detector detects the face of the object after the optical path switch sets the second optical path.

* * * * *